(12) United States Patent
Yokoyama

(10) Patent No.: US 8,429,458 B2
(45) Date of Patent: Apr. 23, 2013

(54) METHOD AND APPARATUS FOR SYSTEM ANALYSIS

(75) Inventor: Ken Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 409 days.

(21) Appl. No.: 12/656,775

(22) Filed: Feb. 16, 2010

(65) Prior Publication Data

US 2010/0153783 A1    Jun. 17, 2010

Related U.S. Application Data

(63) Continuation of application No. PCT/JP2007/066250, filed on Aug. 22, 2007.

(51) Int. Cl.
G06F 11/00 (2006.01)

(52) U.S. Cl.
USPC ............... 714/37; 714/25; 714/47.1; 714/48

(58) Field of Classification Search ............ 714/37, 714/25, 47.1, 48
See application file for complete search history.

(56) References Cited

U.S. PATENT DOCUMENTS

2005/0289231 A1* 12/2005 Harada et al. ............. 709/224
2006/0195297 A1   8/2006 Kubota et al.

FOREIGN PATENT DOCUMENTS

| JP | 2002-244887 | 8/2002 |
|---|---|---|
| JP | 2006-11683 | 1/2006 |
| JP | 2006-236280 | 9/2006 |

OTHER PUBLICATIONS

Japanese Office Action issued Aug. 30, 2011 in corresponding Japanese Patent Application 2011-063394.
International Search Report for PCT/JP2007/066250, mailed on Nov. 13, 2007.

* cited by examiner

*Primary Examiner* — Scott Baderman
*Assistant Examiner* — Sarai Butler
(74) *Attorney, Agent, or Firm* — Staas & Halsey LLP

(57) ABSTRACT

A system analyzing method for analyzing a transaction system includes firstly extracting a transaction, which is processed by a plurality of servers cooperating with each other in the transaction system, from a message log in which parameters of messages have been subjected to name merge, by using a transaction model which is generated from a set of messages transmitted between the servers during processing of the transaction, and secondly extracting a transaction from a message log from which no transaction is extracted in the firstly extracting, by using a value of a parameter inherited between the servers among parameters in messages included in the message log.

7 Claims, 17 Drawing Sheets

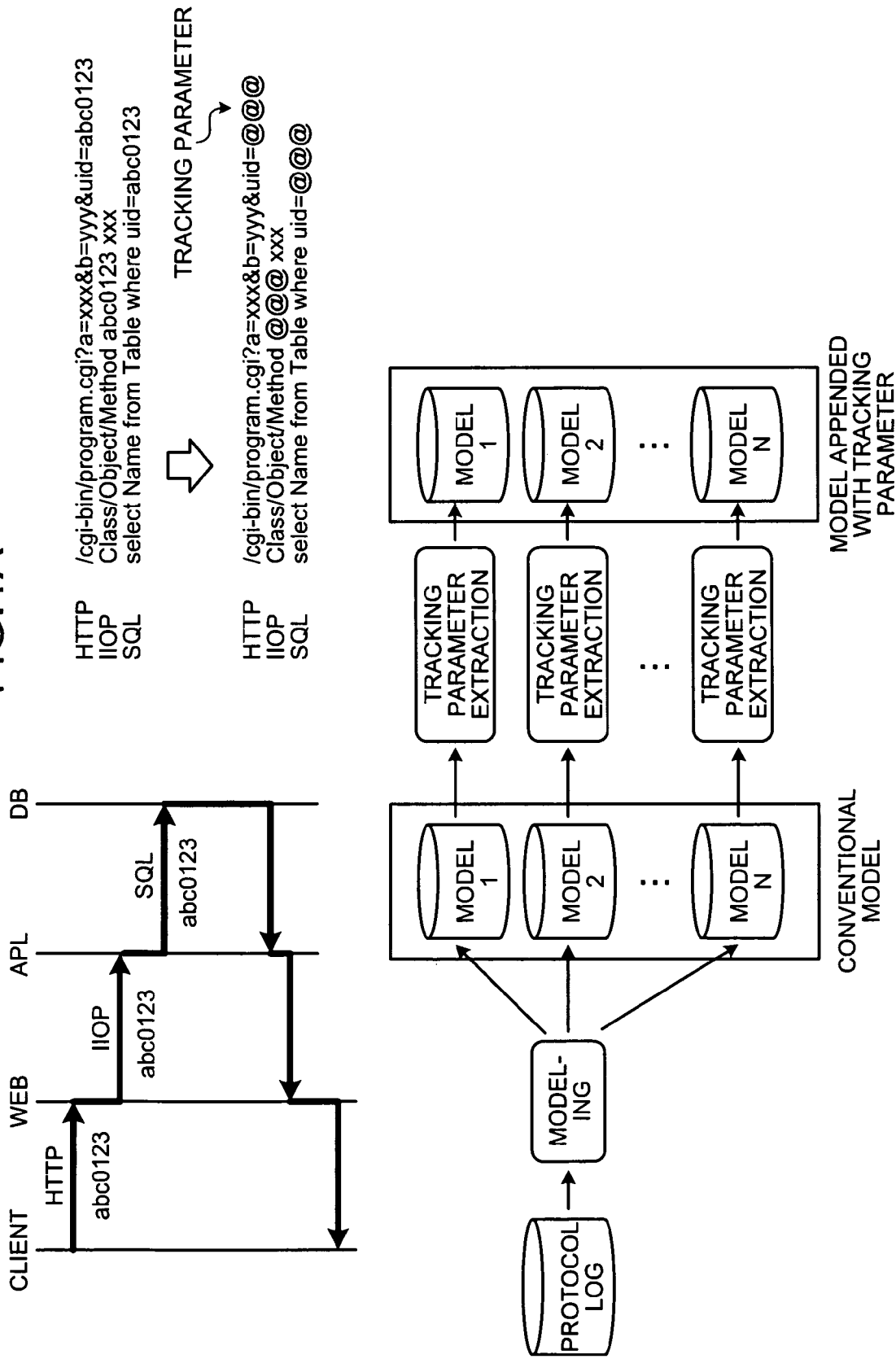

FIG.4

| MODEL ID | MODEL NAME | PROTOCOL | MESSAGE |
|---|---|---|---|
| 1 | LOGIN | HTTP | /cgi-bin/login.cgi?uid=@@@ |
| | | IIOP | Class/Object/Method @@@ |
| | | SQL | select Name from UserTable where uid=@@@ |
| 2 | PRODUCT SEARCH | HTTP | /cgi-bin/search.cgi?itemno=@@@ |
| | | IIOP | Class/Object/Method @@@ |
| | | SQL | select Item from ItemTable where itemno=@@@ |
| 3 | PRODUCT ORDER | HTTP | /cgi-bin/order.cgi?func=1&uid=###&itemno=@@@ |
| | | IIOP | Class/Object/Method @@@ |
| | | SQL | select Item from ItemTable where itemno=@@@ |
| 4 | | HTTP | /cgi-bin/order.cgi?func=2&uid=###&item=@@@ |
| | | IIOP | Class/Object/Method @@@ |
| | | SQL | select Item from ItemTable where itemno=@@@ |

ASSIGNING MODEL NAME BY REFERRING TO MESSAGES

| CLOCK TIME | MESSAGE ID | PROTOCOL | DIRECTION | MESSAGE/RESPONSE TIME |
|---|---|---|---|---|
| 00:00:00.020 | 1 | HTTP | REQUEST | /cgi-bin/program.cgi?param1=v1&param2=v2&uid=user0123 |
| 00:00:00.030 | 2 | IIOP | REQUEST | Class/Object/Method user0123 |
| 00:00:00.050 | 3 | SQL | REQUEST | select Name from Table where uid=user0123 |
| 00:00:00.100 | 3 | SQL | RESPONSE | 0.05 (sec) |
| 00:00:00.110 | 2 | IIOP | RESPONSE | 0.08 (sec) |
| 00:00:00.120 | 1 | HTTP | RESPONSE | 0.1 (sec) |

P2

| CLOCK TIME | MESSAGE ID | PROTOCOL | DIRECTION | MESSAGE/RESPONSE TIME |
|---|---|---|---|---|
| 00:00:00.020 | 1 | HTTP | REQUEST | /cgi-bin/program.cgi?param1=###&param2=###&uid=### |
| 00:00:00.030 | 2 | IIOP | REQUEST | Class/Object/Method ### |
| 00:00:00.050 | 3 | SQL | REQUEST | select Name from Table where uid=### |
| 00:00:00.100 | 3 | SQL | RESPONSE | 0.05 (sec) |
| 00:00:00.110 | 2 | IIOP | RESPONSE | 0.08 (sec) |
| 00:00:00.120 | 1 | HTTP | RESPONSE | 0.1 (sec) |

| MODEL ID | CLOCK TIME | MESSAGE ID | PROTOCOL | MESSAGE | RESPONSE TIME |
|---|---|---|---|---|---|
| 1 | 00:00:00.020 | 1 | HTTP | /cgi-bin/program.cgi?param1=###&param2=###&uid=### | 0.1 (sec) |
| | 00:00:00.030 | 2 | IIOP | Class/Object/Method ### | 0.08 (sec) |
| | 00:00:00.050 | 3 | SQL | select Name from Table where uid=### | 0.05 (sec) |

T2

| MODEL ID | CLOCK TIME | MESSAGE ID | PROTOCOL | MESSAGE | RESPONSE TIME |
|---|---|---|---|---|---|
| 1 | 00:00:00.020 | 1 | HTTP | /cgi-bin/program.cgi?param1=v1&param2=v2&uid=user0123 | 0.1 (sec) |
| | 00:00:00.030 | 2 | IIOP | Class/Object/Method user0123 | 0.08 (sec) |
| | 00:00:00.050 | 3 | SQL | select Name from Table where uid=user0123 | 0.05 (sec) |

T3

| MODEL ID | CLOCK TIME | MESSAGE ID | PROTOCOL | MESSAGE | RESPONSE TIME |
|---|---|---|---|---|---|
| 1 | 00:00:00.020 | 1 | HTTP | /cgi-bin/program.cgi?param1=###&param2=###&uid=@@@ | 0.1 (sec) |
| | 00:00:00.030 | 2 | IIOP | Class/Object/Method @@@ | 0.08 (sec) |
| | 00:00:00.050 | 3 | SQL | select Name from Table where uid=@@@ | 0.05 (sec) |

| MODEL ID | PROTOCOL | MESSAGE |
|---|---|---|
| 1 | HTTP | /cgi-bin/program.cgi?param1=###&param2=###&uid=### |
| | IIOP | Class/Object/Method ### |
| | SQL | select Name from Table where uid=### |

M2

| MODEL ID | PROTOCOL | MESSAGE |
|---|---|---|
| 1 | HTTP | /cgi-bin/program.cgi?param1=###&param2=###&uid=@@@ |
| | IIOP | Class/Object/Method @@@ |
| | SQL | select Name from Table where uid=@@@ |

| CLOCK TIME | MESSAGE ID | PROTOCOL | DIRECTION | MESSAGE/RESPONSE TIME |
|---|---|---|---|---|
| 09:00:00.000 | 100 | HTTP | REQUEST | /cgi-bin/program.cgi?param1=v1&param2=v2&uid=user1111 |
| 09:00:00.010 | 101 | HTTP | REQUEST | /cgi-bin/program.cgi?param1=v3&param2=v4&uid=user2222 |
| 09:00:00.040 | 102 | IIOP | REQUEST | Class/Object/Method user1111 |
| 09:00:00.050 | 103 | IIOP | REQUEST | Class/Object/Method user2222 |
| 09:00:00.070 | 104 | SQL | REQUEST | select Name from Table where uid=user1111 |
| 09:00:00.080 | 105 | SQL | REQUEST | select Name from Table where uid=user2222 |
| 09:00:00.120 | 105 | SQL | RESPONSE | 0.04 (sec) |
| 09:00:00.130 | 104 | SQL | RESPONSE | 0.06 (sec) |
| 09:00:00.140 | 102 | IIOP | RESPONSE | 0.1 (sec) |
| 09:00:00.150 | 103 | IIOP | RESPONSE | 0.1 (sec) |
| 09:00:00.160 | 100 | HTTP | RESPONSE | 0.16 (sec) |
| 09:00:00.170 | 101 | HTTP | RESPONSE | 0.16 (sec) |

P4

| CLOCK TIME | MESSAGE ID | PROTOCOL | DIRECTION | MESSAGE/RESPONSE TIME |
|---|---|---|---|---|
| 09:00:00.000 | 100 | HTTP | REQUEST | /cgi-bin/program.cgi?param1=###&param2=###&uid=### |
| 09:00:00.010 | 101 | HTTP | REQUEST | /cgi-bin/program.cgi?param1=###&param2=###&uid=### |
| 09:00:00.040 | 102 | IIOP | REQUEST | Class/Object/Method ### |
| 09:00:00.050 | 103 | IIOP | REQUEST | Class/Object/Method ### |
| 09:00:00.070 | 104 | SQL | REQUEST | select Name from Table where uid=### |
| 09:00:00.080 | 105 | SQL | REQUEST | select Name from Table where uid=### |
| 09:00:00.120 | 105 | SQL | RESPONSE | 0.04 (sec) |
| 09:00:00.130 | 104 | SQL | RESPONSE | 0.06 (sec) |
| 09:00:00.140 | 102 | IIOP | RESPONSE | 0.1 (sec) |
| 09:00:00.150 | 103 | IIOP | RESPONSE | 0.1 (sec) |
| 09:00:00.160 | 100 | HTTP | RESPONSE | 0.16 (sec) |
| 09:00:00.170 | 101 | HTTP | RESPONSE | 0.16 (sec) |

| MODEL ID | CLOCK TIME | MESSAGE ID | PROTOCOL | MESSAGE | RESPONSE TIME |
|---|---|---|---|---|---|
| 1 | 09:00:00.000 | 100 | HTTP | /cgi-bin/program.cgi?param1=###&param2=###&uid=### | 0.16 (sec) |
| | 09:00:00.010 | 101 | HTTP | /cgi-bin/program.cgi?param1=###&param2=###&uid=### | 0.16 (sec) |
| | 09:00:00.040 | 102 | IIOP | Class/Object/Method ### | 0.1 (sec) |
| | 09:00:00.050 | 103 | IIOP | Class/Object/Method ### | 0.1 (sec) |
| | 09:00:00.070 | 104 | SQL | select Name from Table where uid=### | 0.06 (sec) |
| | 09:00:00.080 | 105 | SQL | select Name from Table where uid=### | 0.04 (sec) |

T5

| MODEL ID | CLOCK TIME | MESSAGE ID | PROTOCOL | MESSAGE | RESPONSE TIME |
|---|---|---|---|---|---|
| 1 | 09:00:00.000 | 100 | HTTP | /cgi-bin/program.cgi?param1=###&param2=###&uid=user1111 | 0.16 (sec) |
| | 09:00:00.010 | 101 | HTTP | /cgi-bin/program.cgi?param1=###&param2=###&uid=user2222 | 0.16 (sec) |
| | 09:00:00.040 | 102 | IIOP | Class/Object/Method user1111 | 0.1 (sec) |
| | 09:00:00.050 | 103 | IIOP | Class/Object/Method user2222 | 0.1 (sec) |
| | 09:00:00.070 | 104 | SQL | select Name from Table where uid=user1111 | 0.06 (sec) |
| | 09:00:00.080 | 105 | SQL | select Name from Table where uid=user2222 | 0.04 (sec) |

T6

| MODEL ID | CLOCK TIME | MESSAGE ID | PROTOCOL | MESSAGE | RESPONSE TIME |
|---|---|---|---|---|---|
| 1 | 09:00:00.000 | 100 | HTTP | /cgi-bin/program.cgi?param1=###&param2=###&uid=user1111 | 0.16 (sec) |
| | 09:00:00.040 | 102 | IIOP | Class/Object/Method user1111 | 0.1 (sec) |
| | 09:00:00.070 | 104 | SQL | select Name from Table where uid=user1111 | 0.06 (sec) |
| | 09:00:00.010 | 101 | HTTP | /cgi-bin/program.cgi?param1=###&param2=###&uid=user2222 | 0.16 (sec) |
| | 09:00:00.050 | 103 | IIOP | Class/Object/Method user2222 | 0.1 (sec) |
| | 09:00:00.080 | 105 | SQL | select Name from Table where uid=user2222 | 0.04 (sec) |

FIG.13

| LOG NUMBER | PROGRAM NAME | PARAMETER NAME | PARAMETER VALUE |
|---|---|---|---|
| 1 | http:// hostname/ dynamic.asp | SESSION-NO UID PARAM3 | 001 aaaaa V3 |
| 2 | http:// hostname/ dynamic.asp | SESSION-NO UID PARAM4 | 02 bbbbb V4 |
| 3 | http:// hostname/ dynamic.asp | SESSION-NO UID PARAM5 | 003 ccccc V5 |

METHOD AND APPARATUS FOR SYSTEM ANALYSIS

CROSS-REFERENCE TO RELATED APPLICATION(S)

This application is a continuation of International Application No. PCT/JP2007/066250, filed on Aug. 22, 2007, the entire contents of which are incorporated herein by reference.

FIELD

The embodiments discussed herein are directed to a method and an apparatus for analyzing a transaction system.

BACKGROUND

In recent years, computer systems have increased their significance as infrastructure in various fields. It has become increasingly desirable that computer systems keep working normally without stopping. For that reason, various technologies are being developed to monitor the operating conditions of a computer system and detect defects in the system at an early stage.

For example, in a business system, analysis of transactions proves useful in monitoring the processing status. One conventional technology described in Japanese Laid-open Patent Publication 2006-11683 collects logs of messages exchanged on a network for transaction processes and estimate transactions based on calling relations between messages in the logs.

FIG. 15 is an explanatory diagram for explaining a system analyzing apparatus that performs system analysis by extracting transactions from a message log. In FIG. 15, an analyzed transaction system includes a WEB server that performs processes in a web layer, an APL server that performs processes in an application (APL) layer, a DB server that performs processes in a database (DB) layer, and switches for connecting the servers. The system analyzing apparatus generates a transaction model using protocol logs collected from the analyzed transaction system, extracts transactions from analyzed protocol logs by referring to the generated transaction model, and analyzes the transaction system.

Herein, a protocol log is a log of messages that are transmitted/received by each server while processing transactions. The messages are communicated using a variety of protocols such as the HyperText Transfer Protocol (HTTP), the Internet Inter-ORB Protocol (IIOP), and the Structured Query Language (SQL) protocol. A transaction model is a model of each transaction generated based on messages transmitted/received by each server for transaction processing. Transaction model is generated for each type of transaction.

In this way, the system analyzing apparatus can extract, without manual assistance, various types of transactions including infrequent transactions that have been processed by the transaction system and analyze the transaction system.

However, in a conventional system analyzing apparatus, the degree of accuracy in extracting transactions decreases when there is high load from a client. FIGS. 16A and 16B are explanatory diagrams for explaining the problems in a conventional system analyzing apparatus.

As illustrated in FIG. 16A, while generating a transaction model and while analyzing messages, a system analyzing apparatus performs a name merge process in which the values of parameters, such as user IDs or session IDs included in messages, are converted into predetermined values according to a name merge rule. In FIG. 16A, according to a name merge rule that the values of parameters "b" and "uid" are to be replaced with "#", the value of the parameter "b" is converted from "yyy" into "#" and the value of the parameter "uid" is converted from "abc0123" to "#".

The values of the parameters such as the user IDs or the session IDs are different for each transaction even if the transaction model is identical. Thus, if the name merge process is not performed, the system analyzing apparatus may falsely recognize transactions of the identical transaction model as transactions of different transaction models because of the different values of the parameters, while performing matching of a message log and a transaction model. Such false recognition can be prevented by performing the name merge process. The details of the name merge process are described in Japanese Laid-open Patent Publication No. 2006-236280.

However, as illustrated in FIG. 16B, if there is high load on a transaction system and if two transactions of the same transaction model have an identical portion, that is, if sets of messages corresponding to two transactions are partly identical, the sets of messages corresponding to these two transactions can be undistinguishable after the name merge. Then, the system analyzing apparatus has difficulties in determining which message corresponds to which transaction. For example, in the case of FIG. 16B, it is not possible to determine which of the two HTTP messages corresponds to a transaction 1 and which HTTP message corresponds to a transaction 2.

SUMMARY

According to an aspect of an embodiment of the invention, a system analyzing method for analyzing a transaction system includes firstly extracting a transaction, which is processed by a plurality of servers cooperating with each other in the transaction system, from a message log in which parameters of messages have been subjected to name merge, by using a transaction model which is generated from a set of messages transmitted between the servers during processing of the transaction, and secondly extracting a transaction from a message log from which no transaction is extracted in the firstly extracting, by using a value of a parameter inherited between the servers among parameters in messages included in the message log.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1A is a first explanatory diagram for explaining a tracking parameter that, when overlapping occurs between a plurality of transactions of an identical model, a system analyzing apparatus according to a present embodiment uses to distinguish the transactions;

FIG. 4 is a schematic diagram of an exemplary model editing screen that is displayed by a model editing unit;

FIG. 6 is a schematic diagram of examples of a protocol log;

FIG. 7 is a schematic diagram of transactions extracted from protocol logs;

FIG. 8 is a schematic diagram of models generated from protocol logs;

FIG. 10 is a schematic diagram of examples of a protocol log;

FIG. 11 is a schematic diagram of transactions extracted from protocol logs;

FIG. 13 is a schematic diagram of exemplary programs, parameters, and parameter values extracted from protocol logs;

DESCRIPTION OF EMBODIMENT(S)

Preferred embodiments of the present invention will be explained with reference to accompanying drawings. The present invention is not limited to the embodiment.

Figure 1B:
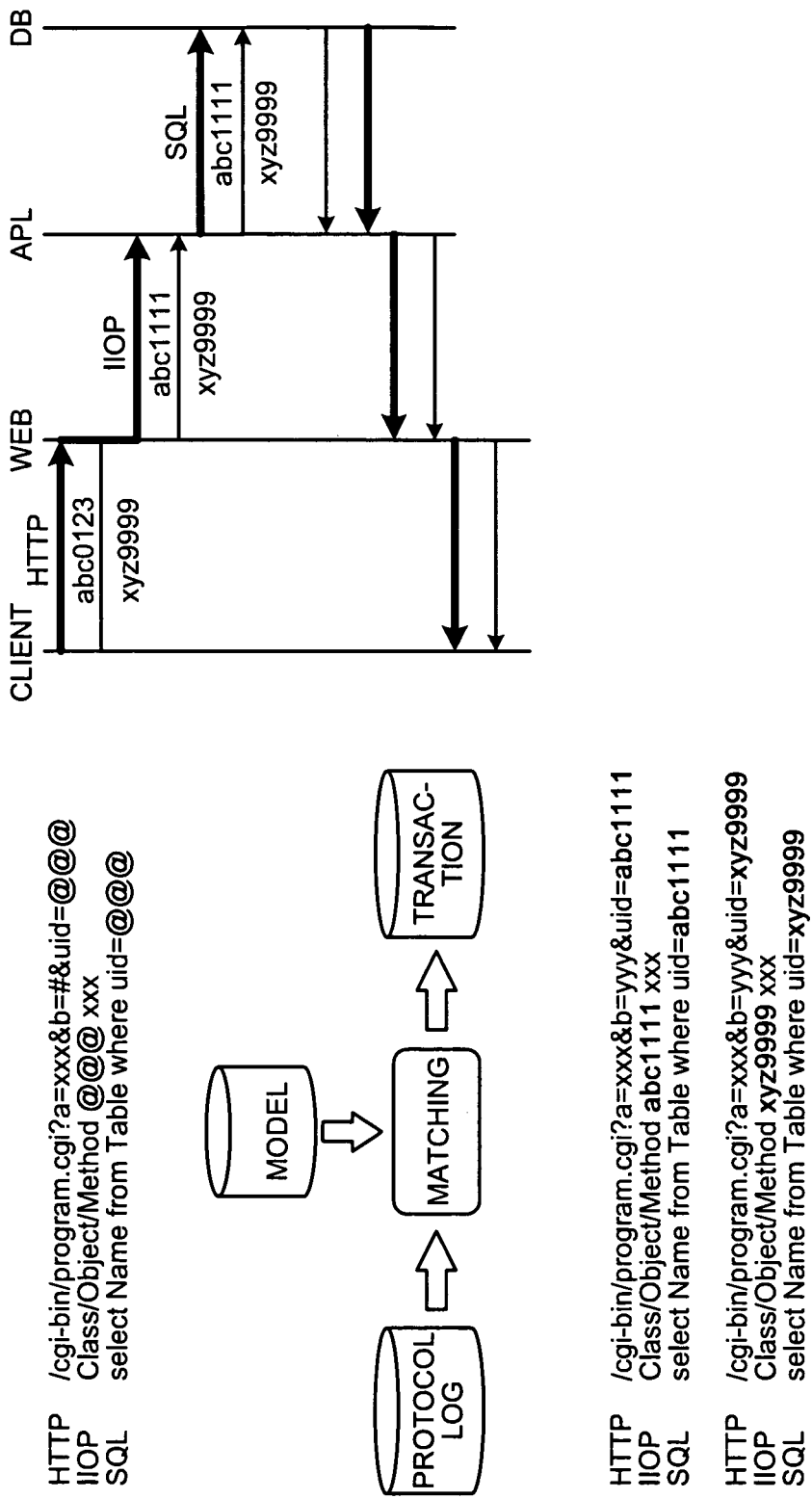
FIG. 1B is a second explanatory diagram for explaining a tracking parameter that, when overlapping occurs between a plurality of transactions of an identical model, the system analyzing apparatus according to the present embodiment uses to distinguish the transactions.

Firstly, the explanation is given regarding a tracking parameter that, when overlapping occurs between a plurality of transactions of an identical transaction model (hereinafter simply referred to as "model"), a system analyzing apparatus according to the present embodiment uses to distinguish the transactions. FIGS. 1A and 1B are explanatory diagrams for explaining a tracking parameter that, when overlapping occurs between a plurality of transactions of an identical model, the system analyzing apparatus according to the present embodiment uses to distinguish the transactions.

As illustrated in FIG. 1A, while generating a model, the system analyzing apparatus according to the present embodiment extracts, from among parameters subjected to name merge, a parameter that is inherited between servers, and appends the parameter as a tracking parameter to the model. In FIG. 1A, the parameter "uid" having the value "abc0123" is inherited between the servers. Thus, the system analyzing apparatus according to the present embodiment appends "uid" as a tracking parameter to the model. More particularly, the system analyzing apparatus according to the present embodiment replaces the value of a parameter subjected to name merge with a value "@@@" indicating that the parameter is a tracking parameter.

Besides, consider a case illustrated in FIG. 1B in which the system analyzing apparatus according to the present embodiment extracts transactions from a protocol log by performing matching of the protocol log and a model. In that case, if it is not possible to distinguish between two transactions that overlap because of unclear parameter values caused by name merge, then the system analyzing apparatus according to the present embodiment restores the original values of the tracking parameter and distinguishes the transactions using the restored values of the tracking parameter.

In FIG. 1B, the values of the tracking parameter of the two indistinguishable transactions are respectively restored to "abc1111" and "xyz9999". Because of that, it can be specified which message corresponds to which transaction.

In this way, while generating a model, the system analyzing apparatus according to the present embodiment appends a tracking parameter to the model; and while analyzing a protocol log, the system analyzing apparatus according to the present embodiment restores the values of the tracking parameter corresponding to the messages of undistinguishable transactions to pre-name-merge values and distinguishes the transactions that were not distinguishable due to name merge.

Figure 2:
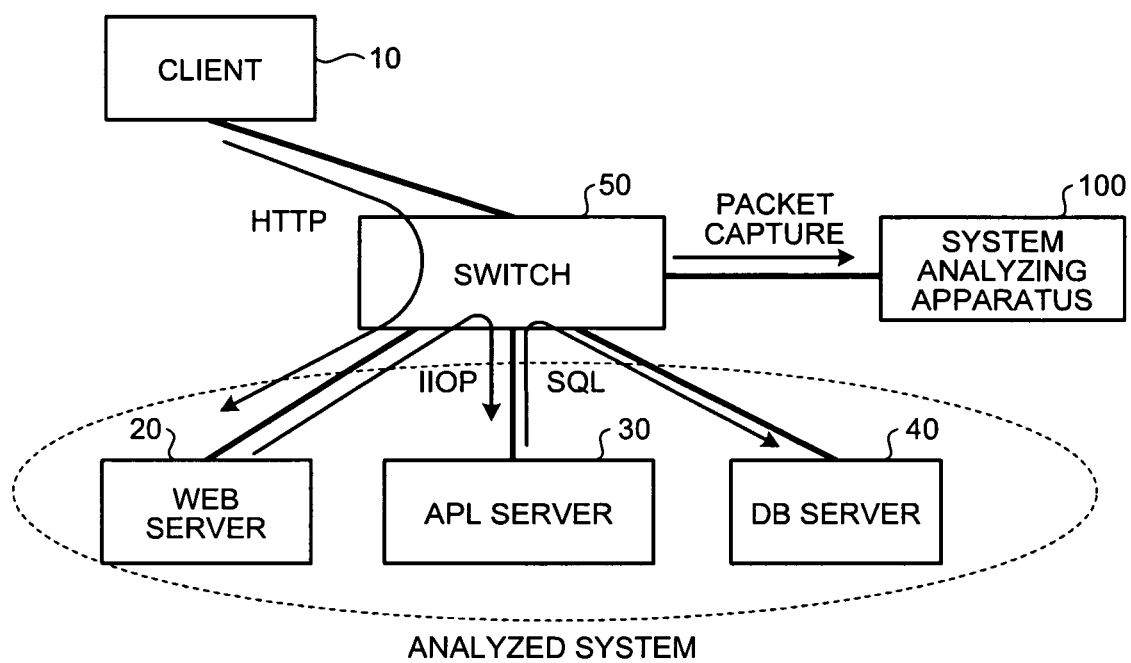
FIG. 2 is a schematic diagram of a system configuration of a transaction-system analyzing system according to the present embodiment.

Given below is the description of a system configuration of a transaction-system analyzing system according to the present embodiment. FIG. 2 is a schematic diagram of a system configuration of the transaction-system analyzing system according to the present embodiment. As illustrated in FIG. 2, an analyzed transaction system includes a WEB server 20, an APL server 30, and a DB server 40. The servers are connected via a switch 50 that in turn is connected to a client 10.

The client 10 demands a service from the WEB server 20 using the HTTP protocol. The WEB server 20 then issues an application execution request to the APL server 30 using the IIOP protocol. In turn, the APL server 30 issues a database processing request to the DB server 40 using the SQL protocol.

A system analyzing apparatus 100 obtains a packet relayed by the switch 50, extracts messages communicated by each server from the obtained packet, and performs model generation or transaction system analysis.

Herein, only one client is illustrated for the sake of simplicity in explanation. However, the system is configured from a plurality of clients. In addition, the WEB server, the APL server, and the DB server can also be disposed in plurality.

Figure 3:
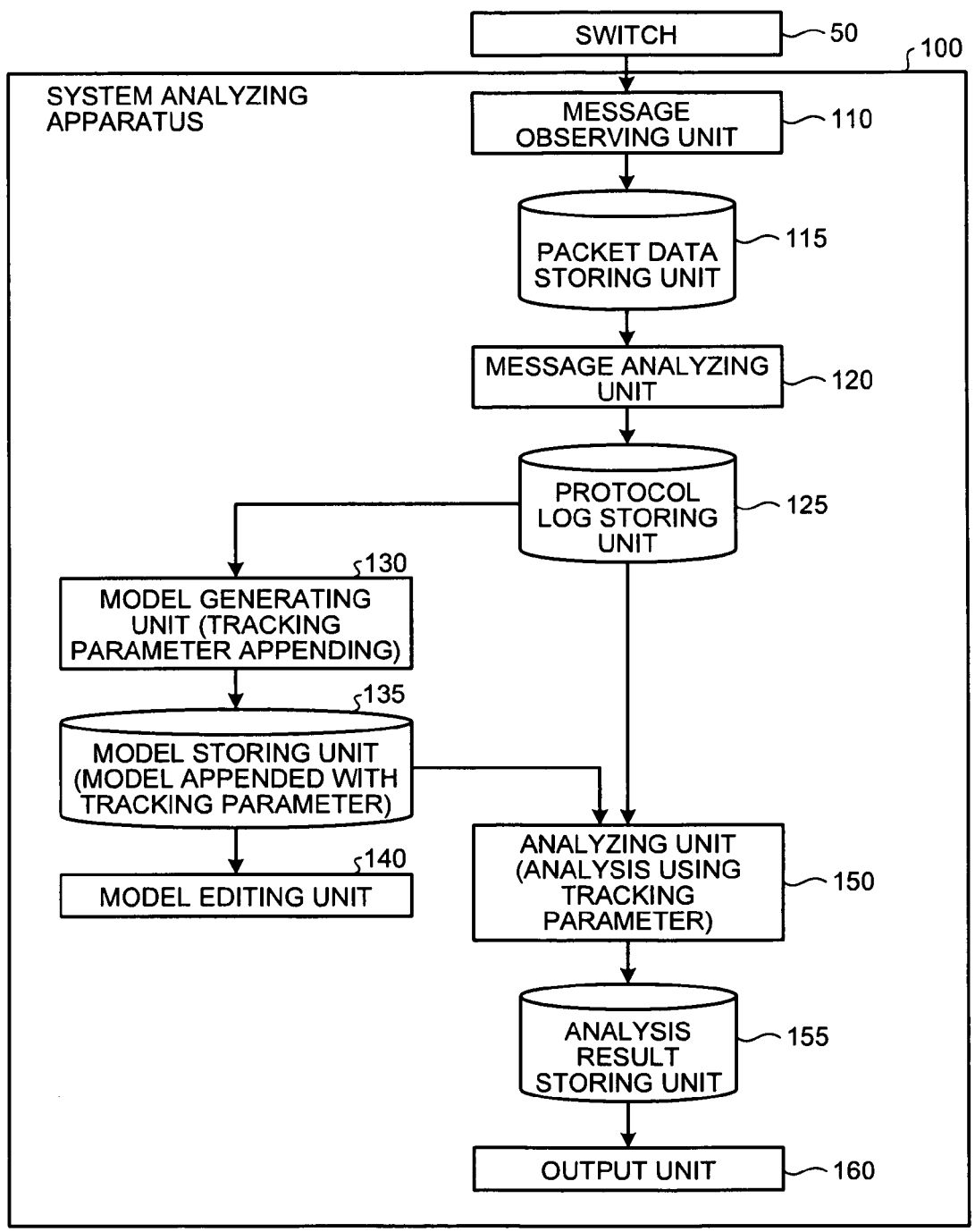
FIG. 3 is a functional block diagram of a configuration of the system analyzing apparatus according to the present embodiment.

Given below is the description of a configuration of the system analyzing apparatus 100 according to the present embodiment. FIG. 3 is a functional block diagram of a configuration of the system analyzing apparatus 100 according to the present embodiment. As illustrated in FIG. 3, the system analyzing apparatus 100 includes a message observing unit 110, a packet data storing unit 115, a message analyzing unit 120, a protocol log storing unit 125, a model generating unit 130, a model storing unit 135, a model editing unit 140, an analyzing unit 150, an analysis result storing unit 155, and an output unit 160.

The message observing unit 110 is a processing unit that obtains packet data from the switch 50 and stores it in the packet data storing unit 115. Thus, the packet data storing unit 115 is a memory unit that is used to store the packet data that the message observing unit 110 obtains from the switch 50.

The message analyzing unit 120 is a processing unit that analyzes the packet data stored in the packet data storing unit 115, generates a log of messages of a predetermined protocol as a protocol log, and stores the generated protocol log in the protocol log storing unit 125.

Thus, the protocol log storing unit 125 is a memory unit that is used to store the protocol log generated by the message analyzing unit 120. More particularly, at the time of model generation, the protocol log storing unit 125 is used to store a model generation protocol log that is used in generating a model; while at the time of transaction system analysis, the protocol log storing unit 125 is used to store an analyzed protocol log that is subjected to analysis.

The model generating unit 130 is a processing unit that, based on the messages communicated by each server, generates a transaction model by referring to the model generation protocol log and stores the generated model in the model storing unit 135. While generating a model, the model generating unit 130 appends a tracking parameter to the model. The details of the operations performed by the model generating unit 130 are given later. The model storing unit 135 is a memory unit that is used to store the model generated by the model generating unit 130.

The model editing unit 140 is a processing unit that is used in editing of the model stored in the model storing unit 135. The model editing unit 140 is used, for example, to assign model names that are easily understandable to the system analyzer. FIG. 4 is a schematic diagram of an exemplary model editing screen that is displayed by the model editing unit 140. The system analyzer can assign a name to each model using the screen illustrated in FIG. 4.

The analyzing unit 150 is a processing unit that compares the analyzed protocol logs stored in the protocol log storing unit 125 with the model stored in the model storing unit 135, extracts the analyzed protocol logs that match with the model as transactions, and stores the extracted transactions in the analysis result storing unit 155. When overlapping occurs between a plurality of transactions of an identical model, the analyzing unit 150 distinguishes each transaction using the tracking parameter. The details of the operations performed by the analyzing unit 150 are given later.

The analysis result storing unit 155 is a memory unit that is used to store the transactions extracted by the analyzing unit 150. The output unit 160 is a processing unit that outputs the transactions stored in the analysis result storing unit 155 to the outside.

Figure 5:
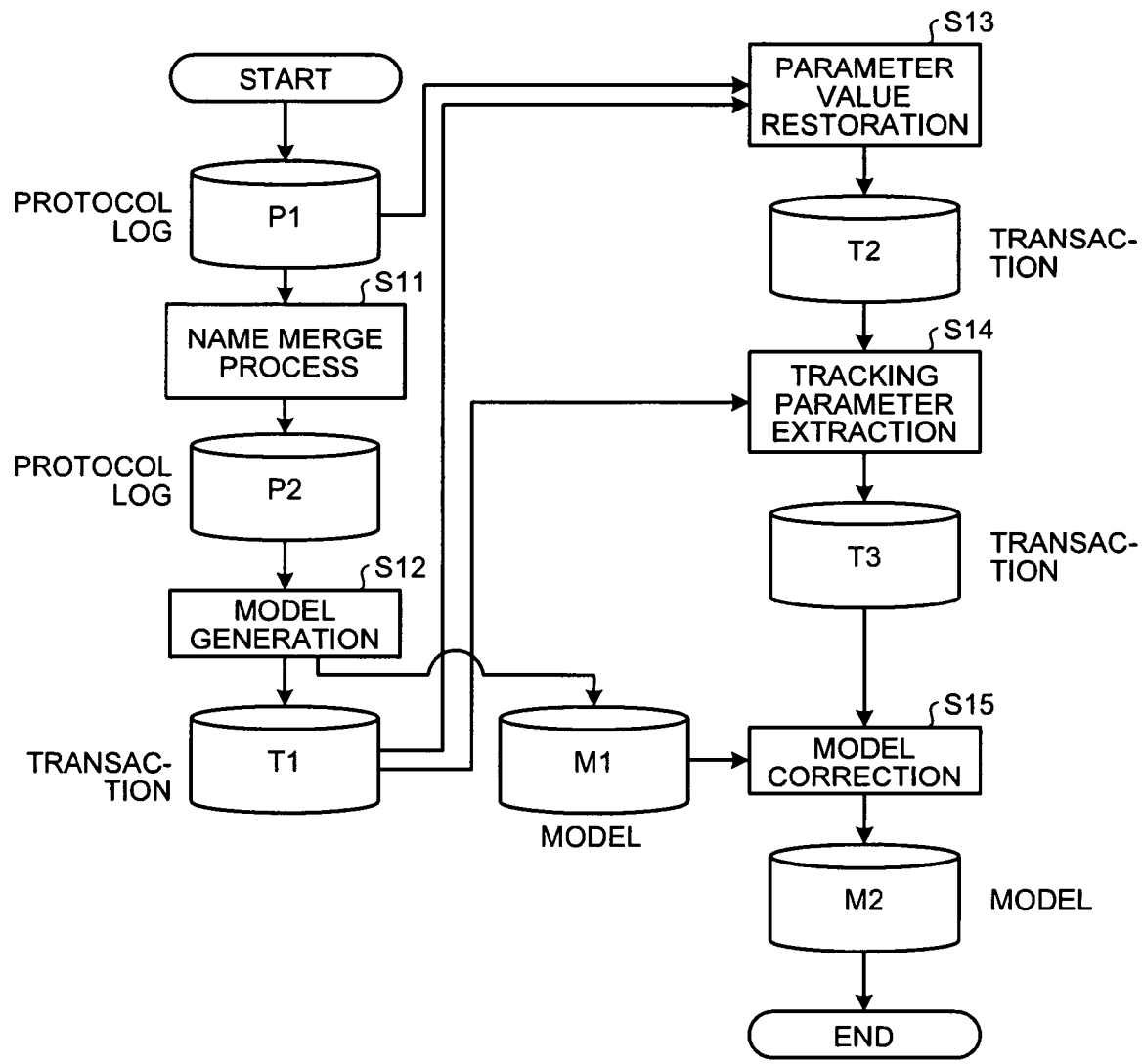
FIG. 5 is a schematic diagram of an operation flow of a model generating unit.

Given below is the detailed description of the operations performed by the model generating unit 130. FIG. 5 is a schematic diagram of an operation flow of the model generating unit 130. As illustrated in FIG. 5, the model generating unit 130 applies a name merge rule to a model generation protocol log P1 that is stored in the protocol log storing unit 125 and generates a protocol log P2 having parameters subjected to name merge (Step S11).

FIG. 6 is a schematic diagram of an example of the protocol log P1 and the protocol log P2. As illustrated in FIG. 6, a protocol log includes the clock time at which messages were relayed; message IDs used in message identification; protocols used in relaying the messages; message directions, that is, whether a message is a request or a response; and message/response time.

Moreover, as illustrated in FIG. 6, the parameters and their respective values such as "param1=v1", "param2=v2", and "uid=user0123" in the protocol log P1 are subjected to name merge and converted into "param1=###", "param2=###", and "uid=###", respectively, in the protocol log P2. The details of name merge process are given later.

Subsequently, the model generating unit 130 performs extraction of a transaction T1 and generation of a model M1 by referring to the protocol P2 obtained by name merge (Step S12). The extracted transaction T1 is illustrated in FIG. 7, while the generated model M1 is illustrated in FIG. 8.

As illustrated in FIG. 7, an extracted transaction is configured from information on a plurality of messages and the respective responses. The information on the messages and the respective responses includes the clock time at which the messages were relayed; the message IDs used in message identification; the protocols used in relaying the messages; the actual messages; and the response time. Besides, as illustrated in FIG. 8, a generated model includes a model ID used in model identification and information on a plurality of protocols and the respective messages that configure the corresponding model.

Subsequently, with respect to each message in the transaction T1, the model generating unit 130 refers the protocol log P1 for a request having the same message ID, restores the original values of the parameters subjected to name merge, and generates a transaction T2 (Step S13). For example, as illustrated in FIG. 7, the parameters and the respective values such as "param1=###", "param2=###", and "uid=###" subjected to name merge in the transaction T1 are restored to "param1=v1", "param2=v2", and "uid=user0123", respectively, in the transaction T2.

Then, the model generating unit 130 compares parameter values in the messages corresponding to the protocols in the transaction T2; extracts a parameter that is inherited between the messages, that is, inherited between the servers; and generates a transaction T3 in which the parameter values of the messages in the pre-name merge transaction T1 are replaced with "@@@" (Step S14). For example, as illustrated in FIG. 7, since the parameter value "user0123" is inherited in the transaction T2; the corresponding parameter "uid" is extracted as the tracking parameter. Then, in the transaction T3, "@@@" is substituted as the value of "uid".

Subsequently, regarding each model of M1, the model generating unit 130 refers to the transaction T3 for a transaction having the same model ID, changes to "@@@" the value of a parameter for which all values in that particular transaction are "@@@", and generates a model M2 (Step S15). For example, as illustrated in FIG. 8, the parameter and the corresponding value "uid=###" subjected to name merge in the model M1 is replaced with "uid=@@@" in the model M2.

In this way, the model generating unit 130 appends a tracking parameter to a model. Because of that, even when overlapping occurs between a plurality of transactions of an identical model, the analyzing unit 150 is able to distinguish each transaction referring to the tracking parameter.

Figure 9:
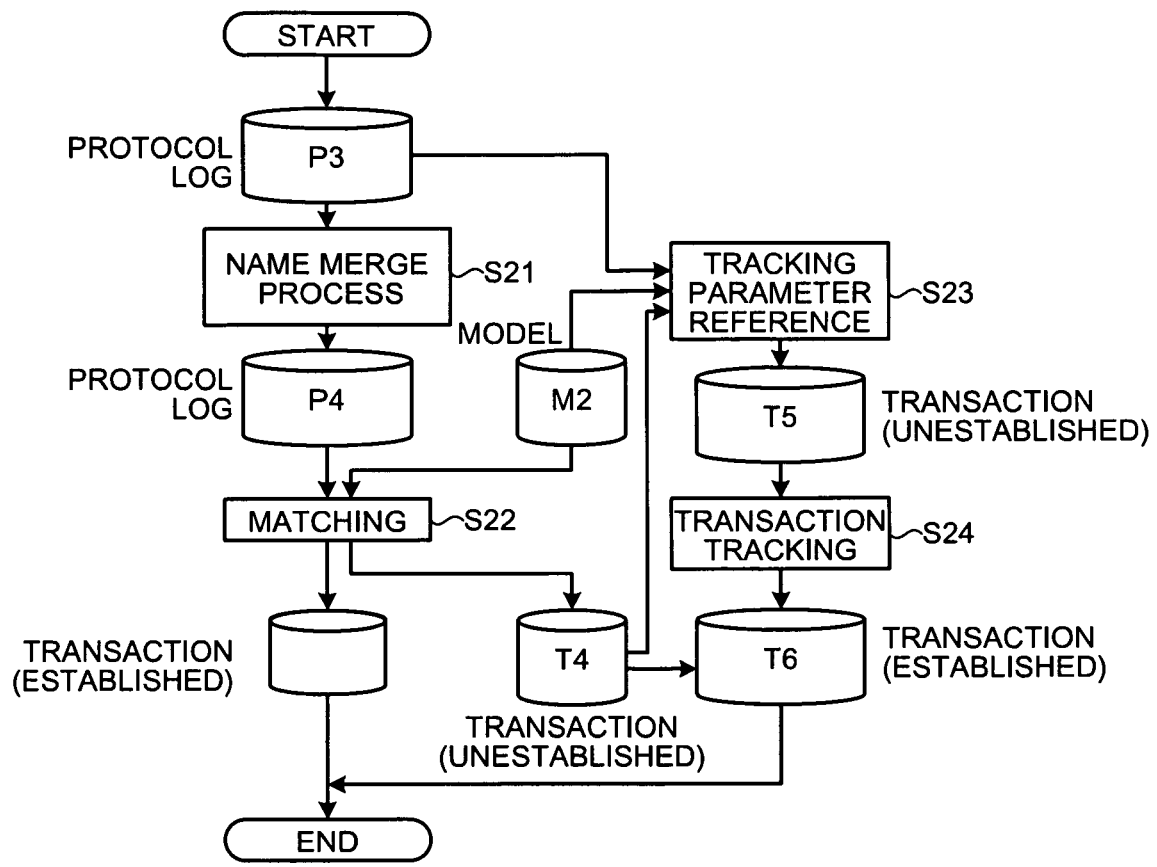
FIG. 9 is a schematic diagram of an operation flow of an analyzing unit.

Given below is the detailed description of the operations performed by the analyzing unit 150. FIG. 9 is a schematic diagram of an operation flow of the analyzing unit 150. As illustrated in FIG. 9, the analyzing unit applies a name merge rule to a protocol log P3 that is stored as an analyzed log in the protocol log storing unit 125 and generates a protocol log P4 having parameters subjected to name merge (Step S21).

FIG. 10 is a schematic diagram of an example of the protocol log P3 and the protocol log P4. As illustrated in FIG. 10, the parameters and the respective values such as "param1=v1", "param2=v2", and "uid=user1111" in the protocol log P3 are subjected to name merge and converted into "param1=###", "param2=###", and "uid=###", respectively, in the protocol log P4.

Subsequently, the analyzing unit 150 compares the protocol log P4 subjected to name merge with the model M2 and performs matching to extract transactions from the protocol log P4 (Step S22). At that time, the analyzing unit 150 outputs, as an unestablished transaction T4, a protocol log for transactions that could not be established due to the overlapping of a plurality of transactions of an identical model.

The unestablished transaction T4 is illustrated in FIG. 11. In the protocol log P4 illustrated in FIG. 10, no transaction is extracted because of the overlapping between two transactions of an identical model. Consequently, those transactions are output as unestablished transactions in the unestablished transaction T4 illustrated in FIG. 11.

Then, the analyzing unit 150 compares the unestablished transaction T4 and the model M2, restores the original values of the tracking parameter by referring to the messages having the same message IDs in the protocol log P3, and generates a transaction T5 (Step S23). The transaction T5 generated from the transaction T4 is illustrated in FIG. 11. In the transaction T5, the original values of the tracking parameter "uid" are restored.

Figure 12:
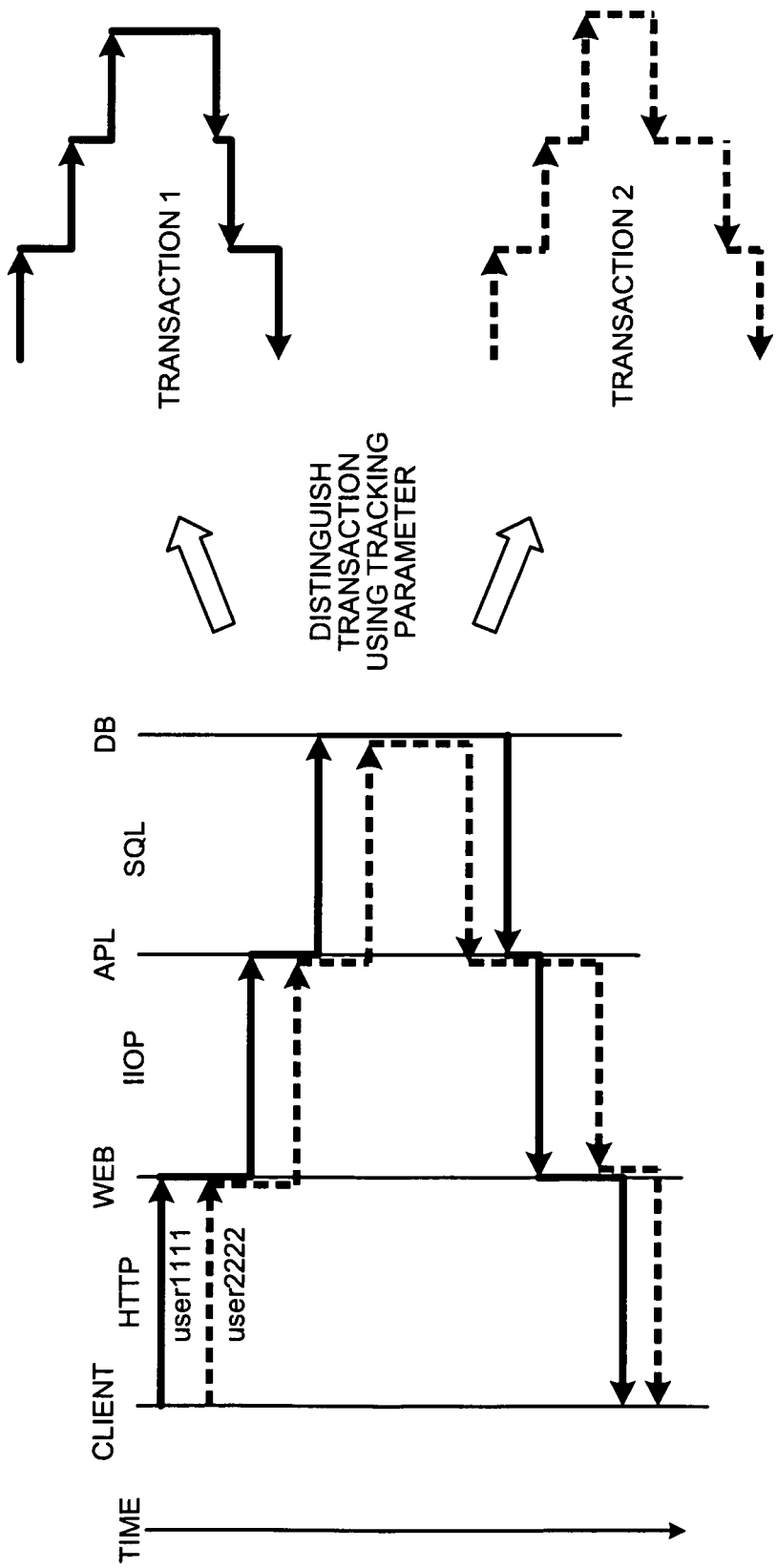
FIG. 12 is a schematic diagram of an example in which, when overlapping occurs between a plurality of transactions of an identical model, the transactions are distinguished using a tracking parameter.

Subsequently, using the tracking parameter in the transaction T5, the analyzing unit 150 extracts each transaction from the plurality of transactions and outputs the extracted transactions as an established transaction T6 (Step S24). The established transaction T6 generated from the transaction T5 is illustrated in FIG. 11. The two transactions in the transaction T5 are separated and extracted as two different transactions in the established transaction T6. FIG. 12 is a schematic diagram of two different transactions separated by the analyzing unit 150.

Given below is the description of name merge process performed by the model generating unit 130. Herein, although the description is given for name merge process performed by the model generating unit 130, the analyzing unit 150 also performs the identical name merge process.

In the name merge process, the model generating unit 130 first performs breakup process on a protocol log. More particularly, the model generating unit 130 retrieves the parameter portion such as a file name, a program name, and an argument from a protocol log.

For example, for a protocol log "http://hostname/dynamic.asp?PARAM1=v1&PARAM2=v2&PARAM3=v3&PARAM4=v4", the model generating unit 130 recognizes the program name identifier (asp) and extracts the parameter portion subsequent to "?". In addition, the model generating unit 130 performs processing to recognize the portion prior to "?" as the program name, recognize the portion subsequent to "?" as the parameter description, and recognize that parameter expressions are described using "&" and that the left parts of "=" represent parameter names and the right parts of "=" represent parameter values.

As the result of breakup process, the model generating unit 130 retrieves the following details from the protocol log.
  program name: http://hostname/dynamic.asp
  parameter name: PARAM1; parameter value: v1
  parameter name: PARAM2; parameter value: v2
  parameter name: PARAM3; parameter value: v3
  parameter name: PARAM4; parameter value: v4

Besides, the model generating unit 130 identifies parameters holding a set of identification numbers or user IDs and replaces the respective parameter values with the fixed value "###". More particularly, the model generating unit 130 counts the value types for each parameter and, regarding the parameters having the number of value types exceeding a predetermined number, replaces the respective parameter values with the fixed value "###".

For example, consider following protocol logs:
  (1) http://hostname/dynamic.asp?SESSION-NO=001&ID=aaaaa&PARAM3=v3
  (2) http://hostname/dynamic.asp?SESSION-NO=002&UID=bbbbb&PARAM4=v4
  (3) http://hostname/dynamic.asp?SESSION-NO=003&UID=ccccc&PARAM5=v5

With respect to each of those protocol logs, the model generating unit 130 retrieves the program name, the parameter name, and the parameter value as illustrated in FIG. 13.

Then, the model generating unit 130 counts the value types of the parameters having the same parameter name (all parameters for the abovementioned three URLs) and, if the number of value types exceeds a predetermined value, replaces the respective parameter values with the fixed string "###".

In FIG. 13, the parameter value of "SESSION-NO" or "UID" is different in each protocol log. For such parameters, the number of value types exceeds the predetermined number and the parameter values are replaced with the fixed string "###".

Meanwhile, since the model generating unit 130 performs the name merge process according to a certain name merge rule, various types of name merge process can be performed by changing the name merge rule.

As described above, in the present embodiment; while generating a model, the model generating unit 130 appends a tracking parameter to the model. Moreover, if overlapping of transactions of an identical model makes it difficult to determine the transactions, the analyzing unit 150 distinguishes the transactions using the values of the tracking parameter. For that reason, even if the system load is high and overlapping occurs between transactions of an identical model, the transactions can be extracted in a correct manner.

In the present embodiment, the description is given regarding the system analyzing apparatus. However, by implementing the configuration of the system analyzing apparatus with software, a system analyzing program having identical functions can be created. Given below is the description of a configuration of a computer that executes the system analyzing program. It is noted that the system analyzing program can be stored in a computer readable storage medium such as a digital versatile disk (DVD) and distributed in a form of a medium.

Figure 14:
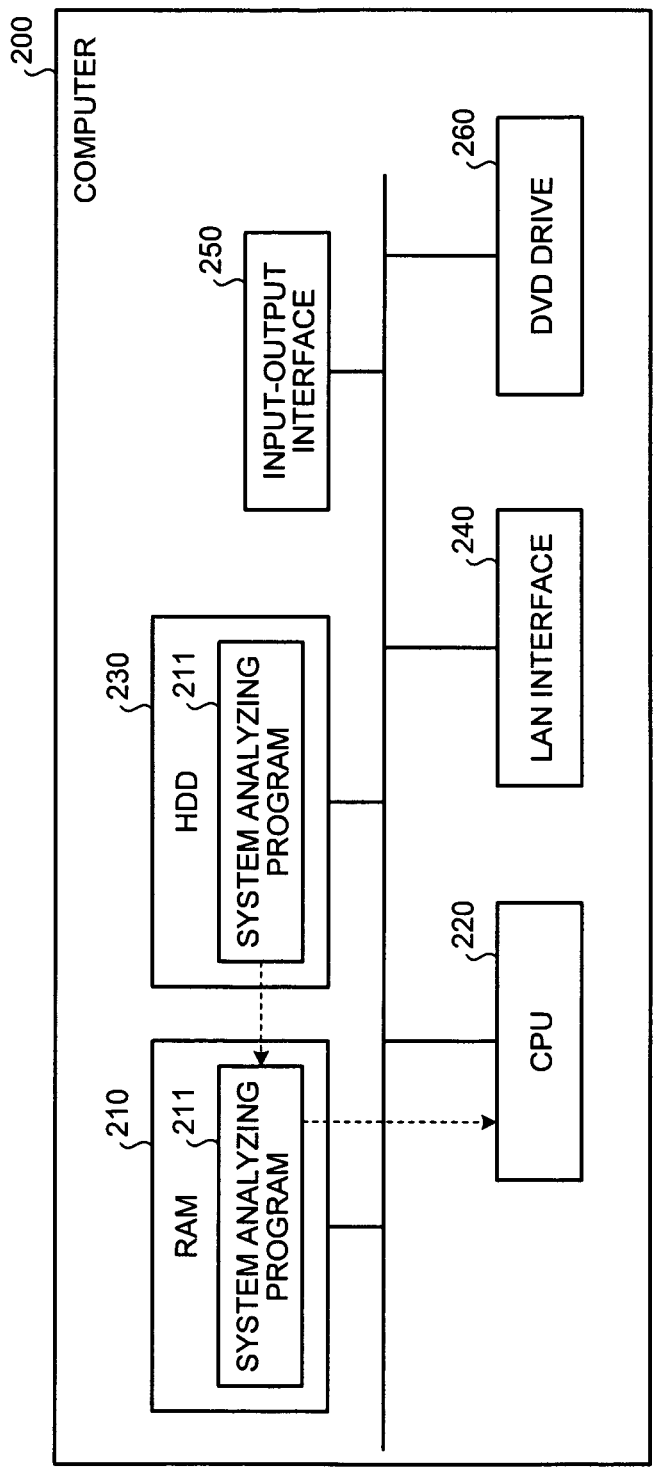
FIG. 14 is a functional block diagram of a configuration of a computer that executes a system analyzing program according to the present embodiment.
Figure 15:
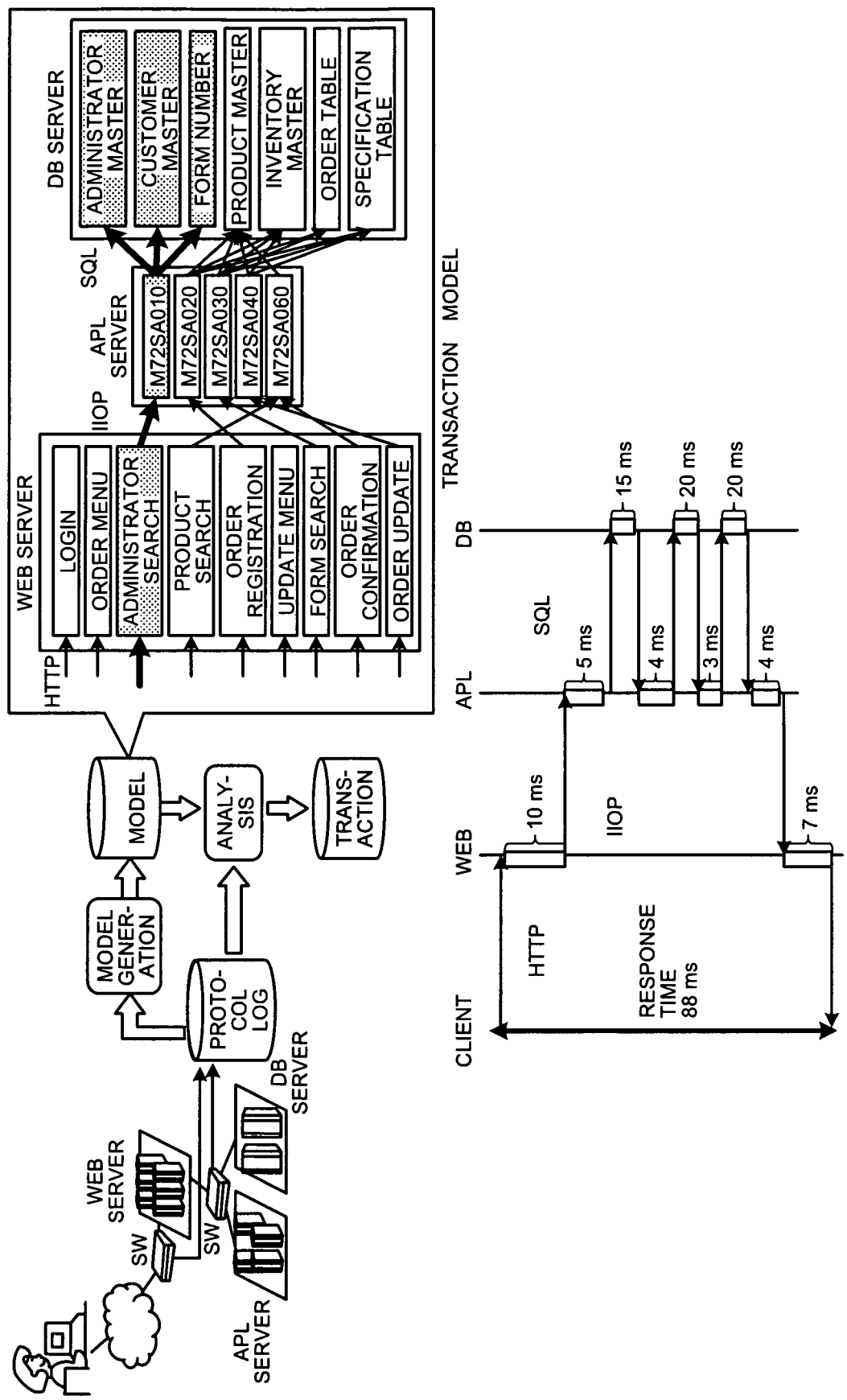
FIG. 15 is an explanatory diagram for explaining a system analyzing apparatus that performs system analysis by extracting transactions from a message log.
Figure 16A:
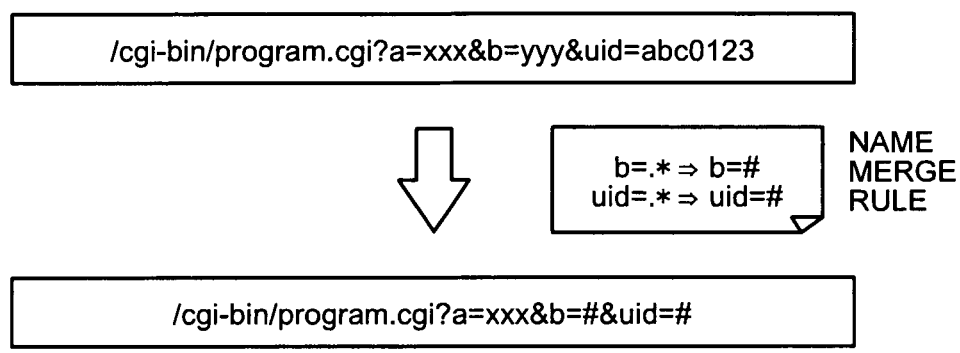
FIGS. 16A and 16B are explanatory diagrams for explaining the problems in a conventional system analyzing apparatus.
Figure 16B:
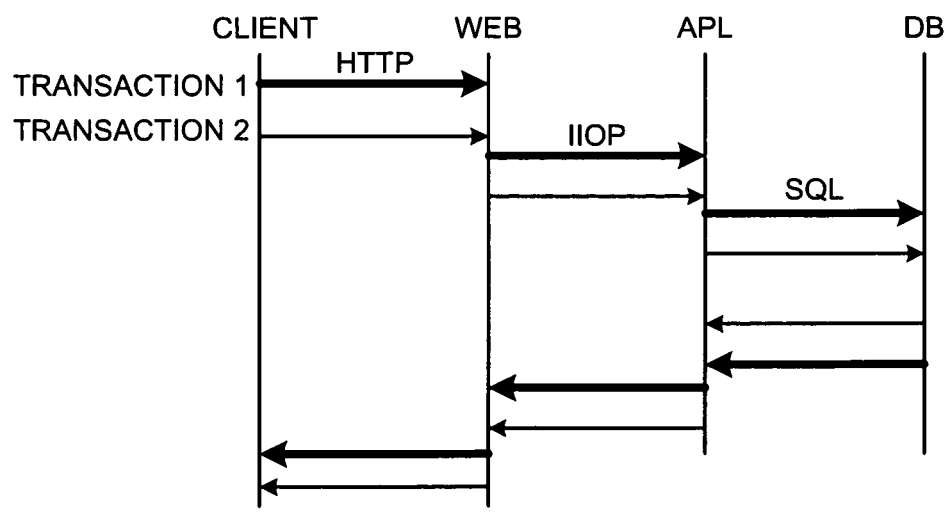

FIG. 14 is a functional block diagram of a configuration of a computer that executes the system analyzing program according to the present embodiment. As illustrated in FIG. 14, a computer 200 includes a random access memory (RAM) 210, a central processing unit (CPU) 220, a hard disk drive (HDD) 230, a local area network (LAN) interface 240, an input-output interface 250, and a digital versatile disk (DVD) drive 260.

The RAM 210 is a memory which stores therein programs or intermediate processing results of programs. The CPU 220 is a central processing unit that reads programs from the RAM 210 and executes them. The HDD 230 is a disk unit which stores therein programs or data. The LAN interface 240 is an interface for connecting the computer 200 to another computer via LAN. The input-output interface 250 is an interface for connecting an input unit such as a mouse or a keyboard and a display unit. The DVD drive 260 is a unit for reading data from a DVD or writing data to a DVD.

A system analyzing program 211 that is to be executed in the computer 200 is stored in a DVD. The system analyzing program 211 is then read from the DVD by the DVD drive 260 and installed in the computer 200. Alternatively, the system analyzing program 211 can be stored in a database of another computer system that is connected via the LAN interface 240. In that case, the system analyzing program 211 is read from that database and installed in the computer 200. Upon being installed, the system analyzing program 211 is stored in the HDD 230 and loaded in the RAM 210. The CPU 220 then reads the system analyzing program 211 and executes it.

According to an embodiment, even if overlapping occurs between a plurality of transactions of an identical model; the transactions are distinguished on an individual basis and extracted. Because of that, the system can be analyzed after the transactions are extracted in a correct manner.

According to an embodiment, when overlapping occurs between a plurality of transactions of an identical model; the operation of distinguishing and extracting the transactions on an individual basis is performed in an efficient manner. That makes it possible to analyze the system in an efficient manner.

According to an embodiment, since a tracking parameter is appended to a transaction model generated by performing name merge; it is possible to append to the transaction model transaction-distinguishing information even after the information is deleted by the name merge.

According to an embodiment, even if overlapping occurs between a plurality of transactions of an identical model; the transactions can be distinguished on an individual basis and in a correct manner.

According to an embodiment, since the transactions are correctly distinguished using a tracking parameter; the system can be analyzed after the transactions are extracted in a correct manner.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable storage medium containing a system analyzing program for analyzing a transaction system, the system analyzing program causing a computer to perform a procedure, the procedure comprising:
    firstly extracting a transaction, which is processed by a plurality of servers cooperating with each other in the transaction system, from message logs in which parameters of messages have been subjected to name merge, by using a transaction model which is generated from a set of messages transmitted between the servers during processing of the transaction; and
    secondly extracting a transaction from message logs from which no transaction is extracted in the firstly extracting, by using a value of a parameter inherited between the servers among parameters in messages included in the message logs.

2. The non-transitory computer readable storage medium according to claim 1, the procedure comprising:
    firstly generating another transaction model by appending to the transaction model, as a tracking parameter, a parameter inherited between the servers among parameters in the messages,
    wherein the secondly extracting includes extracting a transaction by using a value of the tracking parameter appended to the transaction model in the generating.

3. The non-transitory computer readable storage medium according to claim 2, wherein the firstly generating includes
    secondly generating a transaction model by using message logs in which parameters of messages have been subjected to name merge;
    thirdly extracting, as the tracking parameter, the parameter inherited between the servers among the parameters in the messages; and
    appending the tracking parameter extracted to the transaction model generated.

4. The non-transitory computer readable storage medium according to claim 3, wherein
    the secondly generating includes extracting a transaction as well as generating the transaction model by using the message logs in which parameters of messages have been subjected to name merge, and
    the thirdly extracting includes restoring, by using the message logs, a value of a parameter of the transaction extracted in the generating to a value before the name merge, and extracting, as the tracking parameter, a parameter whose value before the name merge is inherited between the messages.

5. The non-transitory computer readable storage medium according to claim 2, wherein the tracking parameter appended to the transaction model in the further generating is a user identifier which identifies a user.

6. A system analyzing method for analyzing a transaction system, the method comprising:
    firstly extracting a transaction, which is processed by a plurality of servers cooperating with each other in the transaction system, from message logs in which parameters of messages have been subjected to name merge, by using a transaction model which is generated from a set of messages transmitted between the servers during processing of the transaction; and
    secondly extracting a transaction from message logs from which no transaction is extracted in the firstly extracting, by using a value of a parameter inherited between the servers among parameters in messages included in the message logs.

7. A system analyzing apparatus for analyzing a transaction system, the apparatus comprising:
    a transaction extracting unit that extracts a first transaction, which is processed by a plurality of servers cooperating with each other in the transaction system, from message logs in which parameters of messages have been subjected to name merge, by using a transaction model which is generated from a set of messages transmitted between the servers during processing of the transaction; and a transaction tracking unit that extracts a second transaction from message logs from which no transaction is extracted by the transaction extracting unit, by using a value of a parameter inherited between the servers among parameters in messages included in the message logs.

* * * * *